T. MATLOCK.
COTTON HARVESTER.
APPLICATION FILED APR. 20, 1914.
1,149,458.
Patented Aug. 10, 1915.
2 SHEETS—SHEET 1.
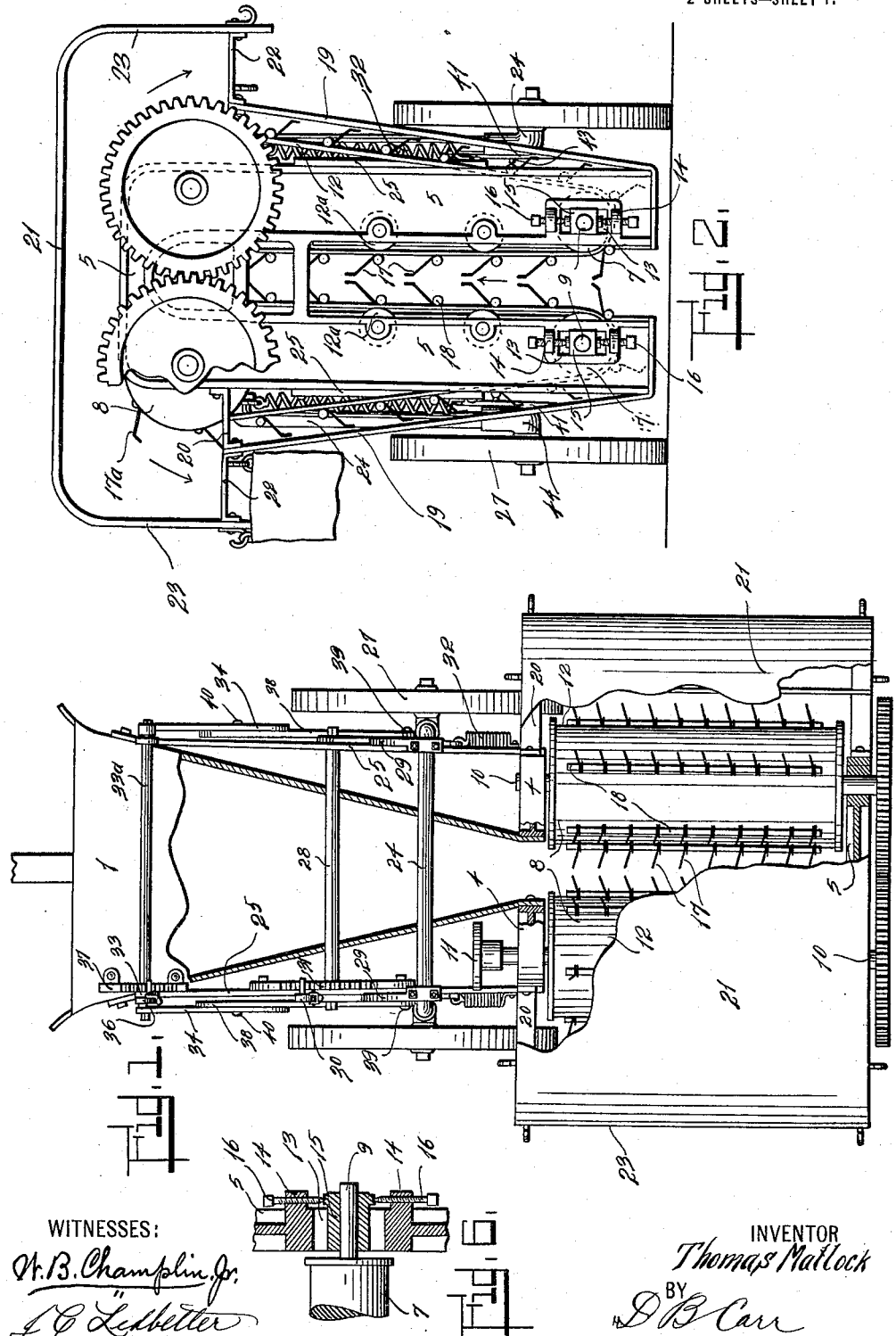
WITNESSES:
INVENTOR
Thomas Matlock
BY
ATTORNEYS

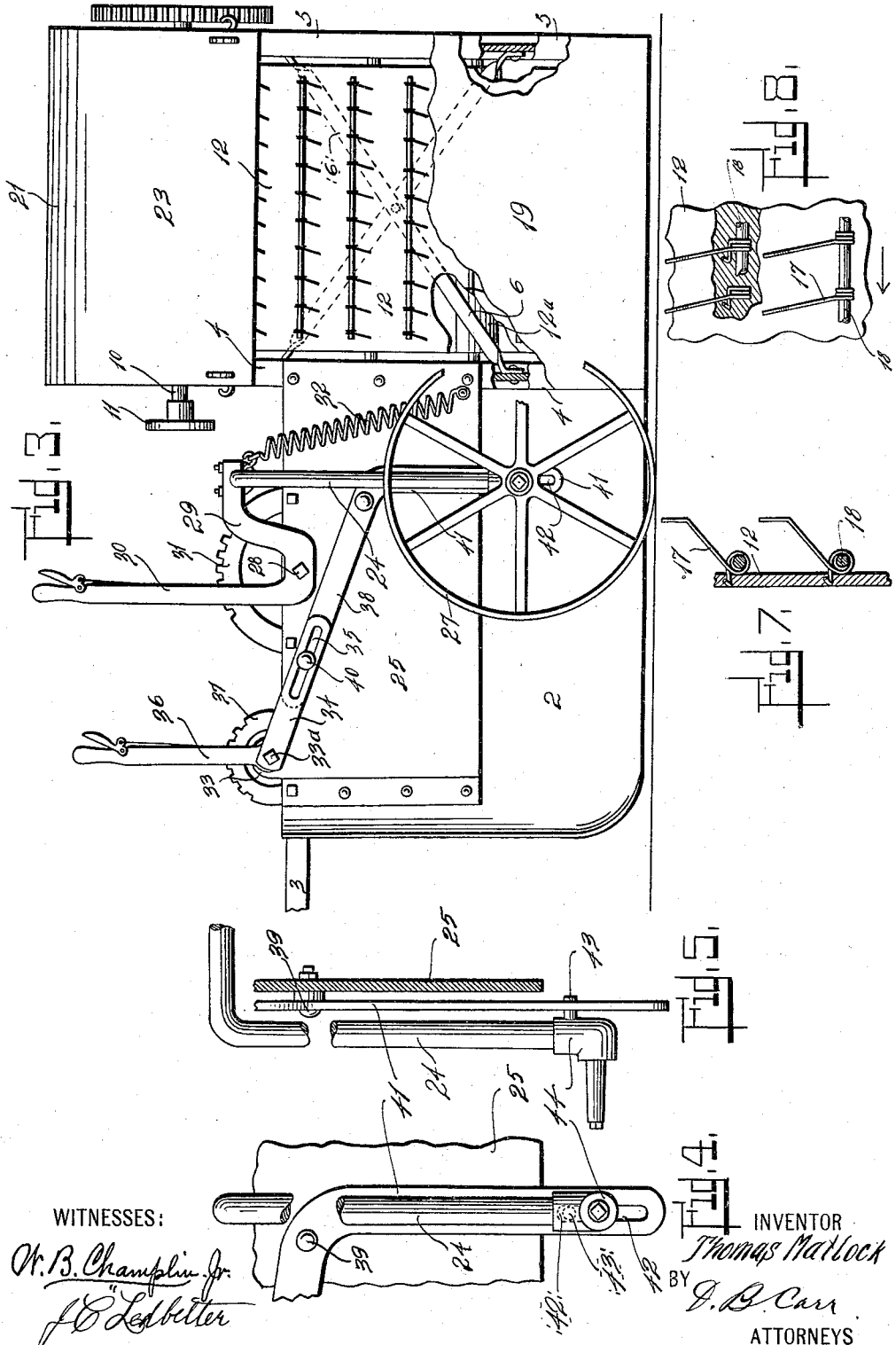

UNITED STATES PATENT OFFICE.

THOMAS MATLOCK, OF MARSHALL, ARKANSAS, ASSIGNOR OF ONE-HALF TO CHAS. L. BOUGHNER, OF ST. JOHN, KANSAS.

COTTON-HARVESTER.

1,149,458.  Specification of Letters Patent.  Patented Aug. 10, 1915.

Application filed April 20, 1914. Serial No. 833,015.

*To all whom it may concern:*

Be it known that I, THOMAS MATLOCK, citizen of the United States of America, residing at Marshall, Arkansas, have invented certain new and useful Improvements in Cotton-Harvesters, of which the following is a specification.

This invention, as specified, relates to new and useful improvement in cotton harvesters.

Primarily the object of the invention is to produce a particular type of wheeled carriage adaptable to mount and carry a picking mechanism, an application for Letters Patent on said picking mechanism having previously been filed.

Another object is to provide a wheeled carriage frame which will be highly adaptable to mount and carry a belted picking mechanism and have provision therein for receiving the cotton plants retaining same in an upright position while the plants are fed through the belted picking mechanism.

Another feature of the machine resides in a provision for receiving the cotton plants, slightly compressing the foliage of said plant and feeding same to the correlated picking mechanism.

Still another object is to provide a wheeled carriage frame for the purposes described which will be provided with means for vertical and horizontal adjustment of the carriage frame and machine upon the ground.

Finally the object is to provide a cotton picker of the character described which will be durable and efficient in operation, comparatively simple to construct and one whose working parts will be unlikely to get out of order.

With these and other objects in view the invention has relation to a certain combination and arrangement of parts, an example of which is illustrated in the accompanying drawings, described in the following specification and pointed out in the appended claims.

Figure 1 is a plan view of the machine, the view being partly in section and having other parts broken away. Fig. 2 is a rear elevation. Fig. 3 is a side elevation. Fig. 4 is a view of a certain balancing lever embodied in the invention. Fig. 5 is a view of the elements shown in Fig. 4, taken as they would appear from the rear. Fig. 6 is a sectional view of the certain adjustable bearing embodied in the invention. Fig. 7 is a partial sectional view illustrating how the picker fingers are fixed to a traveling belt. Fig. 8 is a view of Fig. 7 showing the finger mounting in front elevation, a portion of same being shown in section.

Referring now more in particular to the drawings, wherein the same parts are designated by identical reference numerals, the numerals 1 and 2 designate respectively the upper horizontal wall, and the two vertical side walls of a plant guide hood. Said hood as seen has its forward open end flared and formed substantially wide, while its side walls extend convergently rearward. In the cotton picker here described the plant guide hood will receive the stalks, guide and compress them as they are passed rearwardly to be acted upon by the picker. A tongue 3 is provided for the draft on the machine.

The converging side walls, at their extremities are spaced slightly apart and permanently attached to the inside of either of the legs of an upright arched frame member 4. A similar arched frame member 5 is spaced in parallel proximity to the member 4 by diagonal braces 6.

The spaced frame members and the substantially large forward hood forms the foundation, upon which the various elements are assembled. The assembled arched frame carries the moving picking mechanism which will now be described.

Substantially long horizontally mounted pulleys 7 and 8 respectively are fixed upon shafts 9 and 10, said shafts having their extremities journaled in the arched frame member. The pulleys in pairs, 7 and 8 have their adjacent peripheries tangentially and vertically alined. This will be seen to give the adjacent halves of the endless belts 12 which are carried upon the pairs of rollers 7 and 8 a paralleled proximity. A number of guide pulleys 12ª are journaled in contact with the picking side of the belt, this alines said belt against the picking pressure to which it will be subjected. One of the upper shafts is extended in length on its forward extremity and provided with a flanged, or other suitable coupling 11; said coupling is adapted to receive the power from the motive agent used in driving the mechanism, said power preferably derived from a small gas engine conveniently installed upon the hood (not shown). Means is provided for vertically adjusting the lower pulleys. To this end slotted openings 13 are formed in the lower portion of the frame members, ears 14 being provided adjacent to the slot extremities. The extremities of the shafts 9 carry floating journal boxes 15 said boxes being carried within the walls of the slots 12 as clearly illustrated in Fig. 6, said detail showing clearly how the lower shafts 9 have their extremities mounted in the frame members 4 and 5; adjusting screws 16 are screw threaded into the ears, carrying said journal box. By alternate turns of the screws the belt tension can be varied at will.

Picking fingers 17 are permanently fixed to the belt. Figs. 7 and 8 clearly show their disposition upon the traveling belt. The fingers are coiled near their base and hooked through the belt; the fingers have their free extremities upwardly and outwardly directed from the belt. In respect to the horizontal line of travel of the machine the upper free extremities of the fingers are forwardly directed as indicated by the arrow in Fig. 8. The resilient coils adapt the fingers to nimbly course through the cotton plants yielding to the heavy stalks and body portions but quickly taking up and removing the fiber from the boll when said fingers pass through the boll. The fingers are preferably arranged in regular order on the belt. Reinforcing finger rods 18 are inserted through the coils of the fingers imparting to each row of said fingers a certain strength and rigidity without impairing their flexibility. Said finger rods are slightly less in diameter than the internal diameter of the coils to allow for the contraction of the coils in the resilient and yieldable action of the fingers. The angular disposition, in respect to the horizontal line of travel of the machine, of the fingers upon the belt compensates for the forward movement of the finger through the plant. Such an arrangement prevents the broadside brushing action against the stalk and boll which would result should the fingers be vertically mounted. The finger brace rods 18 prevent any twisting or rearward thrust incident to passing through the stalk. The rear extremities of the shaft 10 have spur gears fixed thereto and intermeshing. This adapts one of the belted pickers to be driven by or through the other from the power coupling 11.

Picker finger guards 19 are fixed to the lower extremities of the arched frame members and extend upward in parallel proximity to the picker fingers, said guards are spaced and held in position at their upper extremities by arms 20 said arms being fixed to the frame members 4 and 5. The finger guards are respectively formed of sheet metal and have a width substantially that of the spaced members 4 and 5. A protective guide bonnet 21 is provided to protect and shelter the traveling pickers, said bonnet being formed of a substantially wide apron 21, said apron being outwardly spaced, and supported by arms 22. This arrangement forms an opening and discharge from the machine of the harvested cotton. Openings are formed between the walls 23 and finger guards, through which the cotton is precipitated from the pickers into the sack suspended from the bonnet.

The traveling pickers are adapted to have their adjacent vertical picking halves upwardly traveled at a sufficient speed to pass a great number of pickers through the plants and centrifugally throw the cotton from the fingers as the revolving pickers pass over the upper pulleys 8. The general direction of the cotton precipitated from the pickers to the sack is represented by the arrows under the bonnet in Fig. 2.

The machine, as a whole, or the carriage, is adapted to be carried by the axle 24, said axle is of the arched type and straddles the machine. Means, correlated with the axle and machine, are provided for adjusting the height above the ground and for maintaining the lateral balance of the machine.

Substantially rectangular frame plates 25 have their forward edges bolted or riveted to the side walls of the hood and their rear extremities secured to the outer vertical faces of the arched frame member.

The arched axle 24 provided with transport wheels 27 spans the hood of the machine swinging said machine therefrom. A square ended transversely journaled shaft 28 carries fixed lift arms 29. The rear extremities of said arms have a pivotal connection with the horizontal portion of the arched axle. Integral with one of the lift arms is a lifting lever 30, said lever being provided with the usual lever rack 31 fixed to the frame plate.

A coil tension equalizing spring 32 is fixed to the arched axle and to the frame plate. This spring is substantially heavy and adapted to exert a pull and lift from the axle to the frame. In actuating the lever 30 and lifting the weight of the machine while adjusting the height of same, the equalizing spring will assist the lifting and adjusting in that it is exerting a pull from the axle on the machine carried below.

Near the forward end of the hood another transverse square ended shaft 33ª is journaled in ears 33 of the frame plate; upon each squared extremity is fixed an actuating arm 34 provided with a slot 35. A balance lever 36 is fixed to the shaft and adapted to engage a lever rack 37. The slotted actuating arms 34, one disposed on either side of the machine, lie in close parallel relation with each other; a pin 40 is fixed to the arm 38 and passes through the slot in the arm 34, this gives a free pivoted motion to the arm 34 about its center 33ᵃ and also allows the same movement of the member 38 about its center 39. A depending portion 41 is provided with a slot 42 and registers with a pin 43, said pin being integral with a collar 44 carried by the shaft. The last described elements are clearly illustrated in Figs. 4 and 5. It is seen how swinging the balancing lever 36 will affect the elements described and move the wheeled axle about its upper extremity as a pivot point. The movement of the member 41 about its center 39 will be seen to effect the balance of the machine upon the arched axle 24 which supports said machine, the horizontal balance of the carriage then may be maintained through the agency of the lever 36 and its correlated elements 34, 38, and 41, said adjustment effecting the, or preserving the, equilibrium of the machine about the shaft 28 as the balancing point.

In the operation of the machine, the belted mechanism will be powered as described and the machine drawn down the row by team. The forward hood will receive, slightly compress and deliver the plant to the moving picking mechanism, the fingers on the belt coursing through the plant, taking the cotton therefrom and precipitating same in the sack as described.

The invention is presented as including all such modifications and changes as may properly come within the scope of the following claims.

Claims:

1. In a wheeled carriage, a frame, a transverse shaft journaled in the frame, lift arms fixed to the shaft, an arched axle carried by the lift arms, and equalizing springs fixed to the frame and axle and adapted to exert an upward pull upon the frame.

2. In a wheeled carriage, a frame, a transverse shaft journaled in said frame, lift arms fixed to the shaft, an arched axle carried by the lift arms, equalizing springs fixed to the frame and axle adapted to exert an upward pull upon the frame, and means provided for adjusting the axle forward or rearward, thereby balancing the carriage upon the axle.

3. In a wheeled carriage, a frame, a transverse shaft journaled in said frame, lift arms fixed to the shaft, an arched axle carried by the lift arms equalizing springs fixed to the frame and axle adapted to exert an upward pull upon the frame, a second transverse shaft journaled in the frame, a lever carried by the second shaft, actuating arms carried by the shaft and means correlated with the actuating arms and arched axle for shifting the position of said axle.

4. In a wheeled carriage, a frame, a transverse shaft journaled in said frame, lift arms fixed to the shaft, an arched axle carried by the lift arms, equalizing springs fixed to the frame and axle adapted to exert an upward pull upon the frame, a second transverse shaft journaled on the hood, a lever carried by the second shaft, actuating arms fixed to the shaft and balancing arms correlated with the actuating arms and arched axle.

5. In a wheeled carriage, a frame, a transverse shaft journaled in said frame, lift arms fixed to the shaft, an arched axle carried by the lift arms, equalizing springs fixed to the frame and axle adapted to exert an upward pull upon the frame, a second transverse shaft journaled in the frame, actuating arms fixed to the shaft, balancing arms pivoted on the frame, a slot formed in the lower extremity of the balancing arms and a pin fixed to the arched axle and confined within the slot of the balancing arm.

6. In a wheeled carriage, a frame, a transverse shaft journaled in said frame, lift arms fixed to the shaft, an arched axle carried by the lift arms, equalizing springs fixed to the frame and axle adapted to exert an upward pull upon the frame, a second transverse shaft journaled on the frame, actuating arms fixed to the second named shaft, slots formed in the actuating arms, balancing arms pivoted on the frame, a pin fixed to one extremity of the balancing arms and loosely confined in the slot of the actuating arms, slots formed in the other extremity of the balancing arms, pins fixed to the axle and being loosely confined in the slots of the balancing arms.

In testimony whereof, I affix my signature in the presence of two witnesses.

THOMAS MATLOCK.

Witnesses:
J. C. LEDBETTER,
CHAS. L. BOUGHNER.

Copies of this patent may be obtained for five cents each, by addressing the "Commissioner of Patents, Washington, D. C."